United States Patent
Powell et al.

(10) Patent No.: US 11,590,998 B2
(45) Date of Patent: Feb. 28, 2023

(54) STROLLER FRAME AND STROLLER

(71) Applicant: CYBEX GmbH, Bayreuth (DE)

(72) Inventors: Iain Powell, Bayreuth (DE); Jiri Spour, Praha—Karlin (CZ)

(73) Assignee: CYBEX GmbH, Bayreuth (DE)

( * ) Notice: Subject to any disclaimer, the term of this patent is extended or adjusted under 35 U.S.C. 154(b) by 292 days.

(21) Appl. No.: 16/629,903

(22) PCT Filed: Jul. 12, 2018

(86) PCT No.: PCT/EP2018/068994
§ 371 (c)(1),
(2) Date: Jan. 9, 2020

(87) PCT Pub. No.: WO2019/012060
PCT Pub. Date: Jan. 17, 2019

(65) Prior Publication Data
US 2021/0078624 A1    Mar. 18, 2021

(30) Foreign Application Priority Data

Jul. 12, 2017    (DE) ...................... 20 2017 104 166.2

(51) Int. Cl.
| | |
|---|---|
| *B62B 9/20* | (2006.01) |
| *B62B 7/00* | (2006.01) |
| *B62B 9/00* | (2006.01) |
| *B62B 5/00* | (2006.01) |
| *B62B 5/04* | (2006.01) |

(52) U.S. Cl.
CPC .............. *B62B 9/00* (2013.01); *B62B 5/0033* (2013.01); *B62B 5/0073* (2013.01); *B62B 5/0404* (2013.01); *B62B 7/00* (2013.01); *B62B 9/203* (2013.01)

(58) Field of Classification Search
CPC ........... B62B 9/00; B62B 9/203; B62B 5/003; B62B 5/0073; B62B 5/0404; B62B 7/00
See application file for complete search history.

(56) References Cited

U.S. PATENT DOCUMENTS

| | | | |
|---|---|---|---|
| 6,065,555 A | 5/2000 | Yuki et al. | |
| 6,871,715 B1 | 3/2005 | Diaz et al. | |
| (Continued) | | | |

FOREIGN PATENT DOCUMENTS

| | | | |
|---|---|---|---|
| CN | 105644606 A | 6/2016 | |
| CN | 106062438 A | 10/2016 | |
| (Continued) | | | |

OTHER PUBLICATIONS

Mechanical translation of EP2332806, Jun. 15, 2011.*

(Continued)

*Primary Examiner* — John D Walters
(74) *Attorney, Agent, or Firm* — Schwegman Lundberg & Woessner, P.A.

(57) ABSTRACT

A stroller frame, comprising at least one motor, particularly an electric motor, for assisted driving of the stroller frame, a pusher bar for pushing the stroller frame and at least one force sensor device for detecting a direction and/or an amount of force and/or a force component acting on the pusher bar, and/or for detecting a value derived from said force or force component, particularly a temporal change of the force or force component.

21 Claims, 2 Drawing Sheets

(56) References Cited

U.S. PATENT DOCUMENTS

Figure 1:
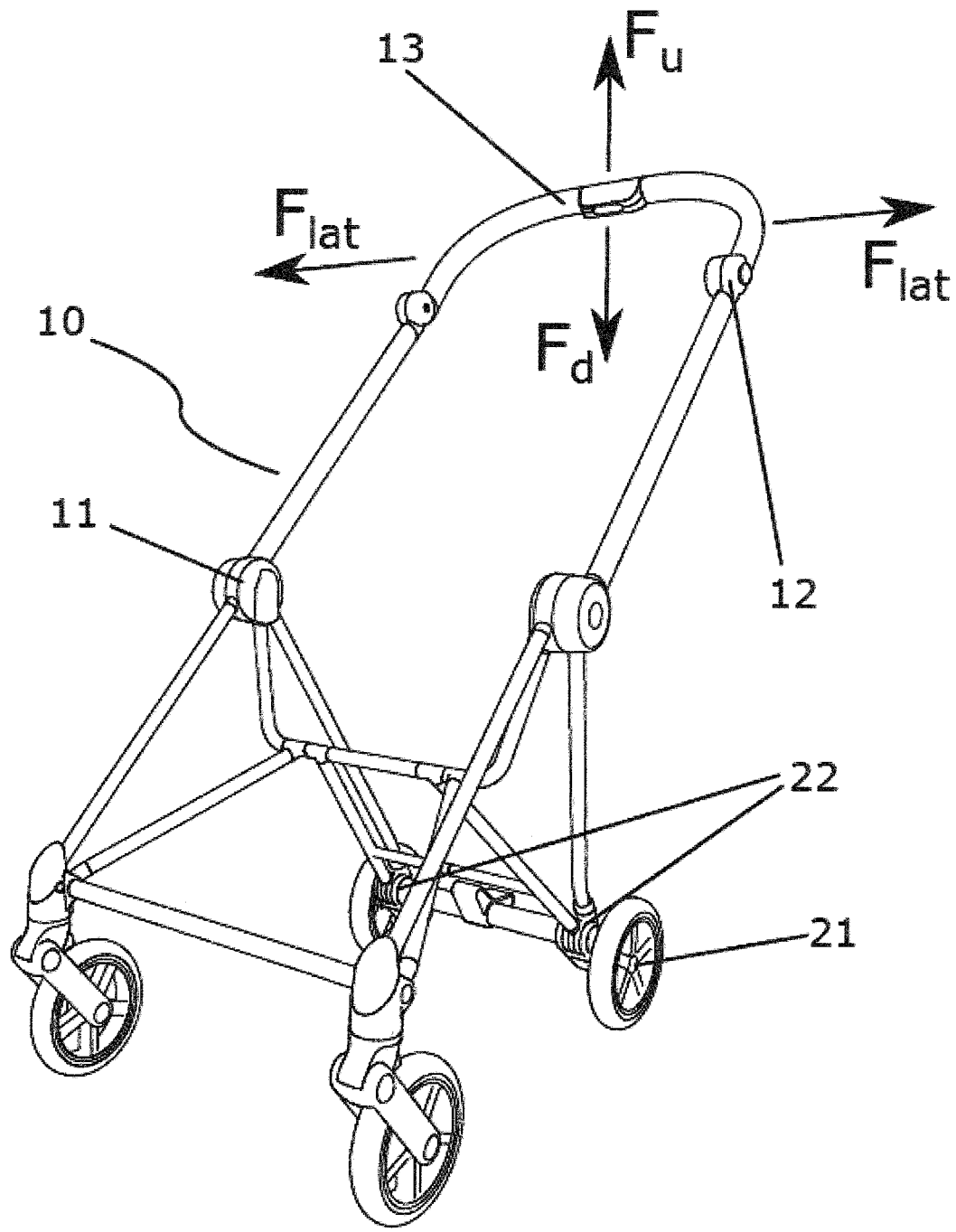

| | | | |
|---|---|---|---|
| 7,383,925 B2 * | 6/2008 | Chen ................ | B62B 9/082 |
| | | | 188/19 |
| 8,706,332 B2 * | 4/2014 | Kume ................ | B62B 3/001 |
| | | | 701/22 |
| 9,925,999 B2 * | 3/2018 | Young ................ | B62B 5/0073 |
| 2011/0313604 A1 | 12/2011 | Kume et al. | |
| 2014/0345956 A1 * | 11/2014 | Kojina ................ | B62B 5/0073 |
| | | | 180/19.1 |
| 2017/0088157 A1 | 3/2017 | Young et al. | |

FOREIGN PATENT DOCUMENTS

| | | | |
|---|---|---|---|
| EP | 0867353 | A2 | 9/1998 |
| EP | 1157914 | A1 | 11/2001 |
| EP | 2332806 | A2 | 6/2011 |
| EP | 2383163 | A1 | 11/2011 |
| JP | 2014227065 | A | 12/2014 |
| JP | 2014231240 | A | 12/2014 |
| JP | 2015160451 | A | 9/2015 |
| RU | 70852 | U1 | 2/2008 |
| WO | WO-2017042959 | A1 * | 3/2017 ........... B62B 5/0073 |
| WO | WO-2019012060 | A1 | 1/2019 |

OTHER PUBLICATIONS

"International Application No. PCT/EP2018/068994, International Preliminary Report on Patentability dated Jan. 23, 2020", (English Translation), 7 pgs.

"Chinese Application No. 201880056706.6, Notification of the First Office Action dated Dec. 7, 2021", (dated Dec. 7, 2021), 24 pgs.

"Indian Application No. 202017006066, Examination report dated Sep. 15, 2021", (dated Sep. 15, 2021), 5 pgs.

"Russian Application No. 2020106541/11, Substantive Examination dated Aug. 13, 2021", (dated Aug. 13, 2021), 11 pgs.

"International Application No. PCT/EP2018/068994, International Search Report and Written Opinion dated Nov. 6, 2018", (dated Nov. 6, 2018), 14 pgs.

"Japanese Application No. 2020-501211, Final Notification of Reasons for Refusal dated Jan. 10, 2023", (Jan. 10, 2023), 6 pgs.

* cited by examiner

STROLLER FRAME AND STROLLER

PRIORITY CLAIM TO RELATED APPLICATIONS

This application is a U.S. national stage filing under 35 U.S.C. § 371 of International Application No. PCT/EP2018/068994, filed on 12 Jul. 2018, and published as WO2019/012060 on 17 Jan. 2019, which claims priority to German Application No. 20 2017 104 166.2, filed on 12 Jul. 2017, the benefit of priority of each of which is claimed herein, and which applications and publication are hereby incorporated herein by reference in their entirety.

DESCRIPTION

The invention relates to a stroller frame and a corresponding stroller with motor assistance.

Motorised strollers are generally known. They may be configured so that they can be moved solely by motor force. It is further generally known to equip strollers with motor assistance which supports the driving force of a person operating the stroller but provides no assistance when no force is exerted by the operating person.

It is further known to arrange a motor on an axle between two wheels of the stroller, wherein the motor drives both wheels attached to the axle.

The known concepts already provide a usable assistance for the person operating the stroller. On the other hand, these concepts are still considered to be rather user-unfriendly and/or rather complex.

It is therefore the object of the invention to suggest a motorised stroller frame which is easy in operation, uncomplicated and sturdy, and a corresponding stroller which particularly allows the person operating the stroller to control the stroller simply, conveniently and intuitively.

This object is solved with a stroller frame according to claim 1.

In particular, the object is solved by stroller frame comprising at least one motor, particularly an electric motor, for driving the stroller frame, at least one pusher bar for pushing the stroller frame and preferably at least one sensor device, particularly a force sensor device. The sensor device, particularly the force sensor device, is preferably designed to detect a force or force component, particularly a direction and/or an amount of a force and/or a force component acting on the pusher bar, and/or to detect a value derived from this force or force component, particularly a temporal change of the force or force component.

One aspect of the invention consists in that a force sensor device is provided which detects either the direction or the amount (or both) of a force and/or a force component (or a value derived from this force or force component). In this way, it is possible for a corresponding control to be exercised based on the output from the sensor device. The output of a sensor device is particularly understood to mean the output of a measured value and/or the output of an average value from a plurality of measured values.

The control may then be exercised internally (by a control device provided on or in the stroller frame) and/or externally by a separate control device (such as for example a mobile terminal, particularly a smartphone). In this context, however, firstly it is significant that any data relating to the force and/or to the values associated with the force can be generated at all. To this extent, it is advantageous, if not necessarily essential, that the stroller frame (or the corresponding stroller) is itself equipped with a control device.

Overall, a user friendly and easily producible stroller frame with motor assistance is suggested.

The measurement of an amount is particularly understood to be the measurement of at least one specific amount (e.g., as specific value of xy Newton) or at least the measurement of whether the force/force component consists of an amount which lies above (or possibly equal to) or below (or possibly equal to) a threshold value.

The pusher bar is preferably constructed as a single part (optionally with individual parts which are movable relative to each other). The pusher bar may particularly have a horizontal handle. Alternatively, the pusher bar may also be constructed as multiple parts (e.g., two parts), for example with multiple handles separated from each other.

In particular with the force-Sensor device, at least two different force-directions (for example forwards and backwards and/or up and down) are detectable and optionally determinable in terms of their amount or at least four directions (for example forwards, backwards, up and down). Optionally, at least two different amounts (>0), preferably at least four different amounts, for example a continuum of amounts for the force (of the force component or value derived therefrom) may be detected with the force sensor device. In any case, information is provided simply by such a force sensor device of such kind which may be used advantageously to control the motor for driving the stroller and the stroller frame.

According to a further (optionally independent) aspect of the invention, a stroller frame (optionally of the type described previously) is suggested wherein multiple motors, particularly electric motors, are provided for driving the stroller frame. Preferably, one motor is assigned to each of at least two or exactly two wheels (for example one left and one right wheel or a first side wheel and a second side wheel). A control device may preferably be provided for individual control of the motors. Alternatively or additionally, a sensor device may be provided for detecting a pushing force and/or moving the stroller frame. Pushing comfort particularly when turning may be improved by multiple (particularly at least or exactly two) motors without the need to adopt complex measures (such as for example with only one motor having a differential gear).

Unless otherwise indicated, pushing or a pushing force should be understood to mean in particular actions and/or forces which may be directed both forwards and backwards (although in the latter case it is also possible to speak of pulling or a tractive force).

To the extent that (two) forces are compared and it is indicated that the (two) forces are equal or different, this should generally be understood as an abbreviation for "equal or different with regard to direction and/or amount of the forces"—unless it is apparent from the context that the direction is specified (such as e.g. in the case of "backward-directed force"); then an indication regarding equal or different forces should relate to the amounts of the forces.

The at least one (force) sensor device may be arranged on and/or in the pusher bar, particularly a handle of the pusher bar, and/or arranged in and/or close to a pusher bar fastening area. A pusher bar fastening area is understood particularly to be an area on which the pusher bar is mounted on a main body of the stroller frame. An arrangement close to the pusher bar fastening area is understood particularly to be an arrangement at a distance of less than 10 cm, preferably less than 5 cm with respect to the pusher bar (wherein in the case of a relatively moving pusher bar the minimum distance in particular is meant here).

According to a further aspect of the invention, a stroller, for example a pushchair, buggy or similar vehicle for children is suggested which includes a stroller frame of the type described above (and in the following text).

According to an independent aspect of the invention, a method for controlling a stroller frame, particularly of the type described above (and in the following text) or of a stroller of the type described above (and in the following text) is suggested, wherein a direction and/or an amount of a force and/or of a force component that acts on a pusher bar, and/or a value derived from this force and/or force component, particularly a temporal change of the force or force component is detected. To the extent that functional features of the stroller frame and/or stroller are described previously and in the following text, they are to be understood to mean that a corresponding method step can be carried out. To this extent, the corresponding device features (such as force sensor device, for example) are not necessarily decisive with regard to the method, but rather the method steps as such (thus for example the detection of a direction and/or of an amount of a force). Of course, corresponding device features (such as for example a force sensor device) as described previously and in the following text may also be present within the method.

Preferably, at least one control device is provided which is in operative connection with the at least one (force) sensor device, particularly in such manner that an output of the at least one sensor is used for controlling the at least one motor. In this way, a simple and reliable detection of the force (or other value, such as for example the current movement) may take place.

In one variant, the at least one sensor device is designed to detect forces and/or force components and/or values derived therefrom acting on the pusher bar in at least two different locations. In particular, this detection may take place on a first (e.g., left) and a second (e.g., right) side of the pusher bar, particularly a first (e.g., left) and a second (e.g., right) side of a handle and/or on two different handles, particularly arranged on either side. To the extent that a left or right side is mentioned here and in the following text, this particularly denotes a left or right side respectively, which is determined from the viewpoint of the person operating the stroller frame or stroller.

In one specific variant, the sensor device is designed to determine force components in the direction of motion and/or opposite the direction of motion (horizontally in each case) and/or upwards and/or downwards (vertically in each case). Alternatively or additionally, corresponding components of a temporal derivation (and/or a temporal change) may be determined.

If acting forces (and/or force components and/or force-deriving values) are detected at several different locations, the control device may be constructed in such manner that the corresponding drive wheels (and optionally attached motors) are actuated depending for example on the value and duration of the (particularly horizontal) impinging forces (and/or their temporal changes) and/or depending on whether the (particularly horizontal) forces (and/or their temporal changes) are exerted in the same direction. A drive wheel (or correspondingly attached motor) may be actuated depending on the force that is present on its side (and/or on the temporal change in this force) and/or depending on the force (and/or its temporal change) that is present on the other (opposite) side.

The control device is preferably designed for controlling and/or regulating the power of the at least one motor, particularly on the basis of the output from the at least one sensor device, for example in discrete steps and/or continuously.

The control device may further be designed in such manner that at least one motor is started when a first threshold of the force and/or force component and/or value derived therefrom is exceeded. A starting of the motor is particularly understood to refer to the situation in which the motor supplies power for driving the stroller frame. In this sense, switching on of the motor (which then idles for example) is not yet considered to be starting. However, starting may possibly also refer to a switching on of the motor (supply of energy) for the first time.

The control device may be designed in such manner that at least one motor is stopped or maintained at constant power when a second threshold of the force and/or force component (of an upward or downward component for example) and/or of the value derived therefrom is exceeded. A stopping of the motor is particularly understood to refer to the placing of the motor in a state in which it no longer drives the stroller. The motor may optionally continue running (in idling mode, for example). However, it may also be understood to mean a final switching off (for example an interruption of energy for supplying the motor). The second threshold may be greater than the first threshold in terms of amount.

The control device may further be designed in such manner that when a threshold $F_d$ of a downward acting force is exceeded and/or when a threshold $F_u$ of an upward acting force is exceeded, wherein $F_d$ and $F_u$ are optionally the same or different (in terms of amount), and/or when a threshold $F_{f2}$ of a forward acting force is exceeded and/or when a threshold $F_{r2}$ of a backwards acting force is exceeded, wherein $F_{f2}$ and $F_{r2}$ are optionally the same or different (in terms of amount), at least one motor is stopped or maintained at a constant power, wherein $F_{f2}$ and/or $F_{r2}$ is preferably greater, particularly 2 times or 5 times or 20 times as great as/greater than $F_u$ and/or $F_d$. The control device is preferably designed in such manner that upon falling below (after previously exceeding) $F_{f2}$, $F_{r2}$, $F_u$ and/or $F_d$ the motor is started (again).

The control function may further be designed in such manner that upon exceeding of a threshold $F_{f1}$ of a forward acting force and/or upon exceeding of a threshold $F_{r1}$ of a backward acting force, wherein $F_{f1}$ and $F_{r1}$ are optionally the same or different (in terms of amount) (and/or optionally upon exceeding of a threshold of a downward acting force and/or upon exceeding of a threshold of an upwards acting force, wherein the threshold of the downward acting force and the threshold of the upward acting force are optionally the same or different) at least one motor is started, wherein $F_{f1}$ is preferably smaller (in terms of amount) than $F_{f2}$ and/or $F_{r1}$ is preferably smaller (in terms of amount) than $F_{r2}$.

Alternatively or additionally, the control device may be designed in such manner that when a (horizontal) force on one of the two sides is positive and a (horizontal) force on the other side is negative (which may correspond to a turning or curved trajectory of the stroller) and/or when a temporal change of the (horizontal) force on the one side is positive and a temporal change of the (horizontal) force on the other side is negative (resulting in a turning or curved trajectory of the stroller), the drive wheels (and/or correspondingly attached motors) are actuated in such manner that only one of the drive wheels (motors) delivers support and/or such that the supporting force does not exceed a predetermined value or that the support from both motors is (completely) stopped or at least considerably reduced.

The stroller frame has at least one speed sensor and/or at least one bending trajectory sensor. The speed sensor is in particular designed in such manner that an amount (and optionally a direction) of a current speed (of the stroller frame relative to a substrate) can be determined. The bending trajectory sensor is preferably designed in such manner that a curvature of a turn or bend (in the path travelled by the stroller frame) is determinable. The control device may then optionally be designed in such manner that the support of the corresponding motor is stopped when a certain speed is exceeded and/or a curvature of the bending trajectory falls below a certain value. In this way, the overall reliability and safety when operating the stroller is improved.

The control device may be designed in such manner that a quotient derived from a pushing force or a (particularly horizontal) pushing force component and a supporting force of the at least one motor is constant, e.g., is 1 or greater than 1 or greater than 2 or greater than 3 or smaller than 1, or is variable, e.g., in such manner that the supporting force increases more or less as linearly with the pushing force or the (particularly horizontal) pushing force component. The supporting force may increase for example polynomially or exponentially or logarithmically with the pushing force.

The control device may further be designed in such manner that a quotient derived from a temporal change of the pushing force or from a temporal change of a (particularly horizontal) pushing force component and a temporal change of the supporting force of the at least one motor is constant, e.g., is 1 or greater than 1 or greater than 2 or greater than 3 or is smaller than 1 or is variable, e.g., in such manner that the temporal change of the supporting force increases more or less linearly with the temporal change of the pushing force or the pushing force component. For example, the temporal change of the supporting force may increase polynomially or exponentially or logarithmically etc. with the temporal change of the pushing force or the temporal change of the pushing force component.

The supporting force (or the temporal change of the supporting force) particularly preferably increases more than (just) linearly with the pushing force or pushing force component (or with the temporal change of the pushing force or temporal change of the pushing force component).

The threshold values and limits described above (and in the following text) may have a predetermined, fixed value or they may be changed, for example by a self-learning algorithm.

The control device is preferably designed in such manner that the driving power of the at least one motor is throttled or stopped when a brake, particularly a retarding brake (service brake) or parking brake is operated.

The pusher bar and/or a section of the pusher bar (particularly that section of the pusher bar which at least partially includes the sensor device) is preferably freely movable, preferably over a range of movement, particularly without the need to carry out a disengagement action, preferably against a restoring force.

The term movement in this sense is particularly not to be understood to mean a movement for (purely) height adjustment of the pusher bar in order to adapt the stroller frame to the height of the operating person, but in particular a (free) movement which may be used particularly for force measurement and/or may serve as feedback for the user that a motor support is in effect. To this extent, a "double feedback" may exist, on the one hand through the effective support of the motor (which can be recognised as such by the user) and at the same time the movement of the pusher bar (or pushing section). Thus, in particular a force measurement may be carried out and at the same time a double-feedback function assured by one and the same movement. If this is compared for example with a piezo sensor (as a relatively compact sensor device), in the present case a comparatively good feedback is given to the user, which makes operation of the stroller easier for the user (and the user does not have to rely solely on detecting the motor support as such, which under certain circumstances may be relatively small).

The (free) movement of the pusher bar (or pusher section) may amount to at least 2 mm or at least 10 mm or at least 20 mm for example. If a force sensor device is compared with a simple piezo sensor for example, a clear improvement is achieved, since more precise information can be provided. A piezo sensor is only able to detect comparatively small relative movements (much less than 1 mm).

Thus in the case of a translational movement this refers particularly to the movement path; in the case of a rotational movement or swivelling, this refers to the path of a point on the swivelled section which moves the greatest distance of all the points. In one variant, the pusher bar or an upper section of the pusher bar (e.g., handle) may be swivellable about a fastening area. Alternatively (or additionally), an (upper) section of the pusher bar may be translationally displaceable with respect to a lower section. In addition, the entire pusher bar may be (translationally) displaceable.

The at least one sensor device may be designed to detect a (temporal) progression of the force (or force component) and/or of the value derived therefrom. In this way, the control may be improved further. For example, it may then become possible to define threshold values for forces (or force components) and/or their temporal changes and threshold values for a time, wherein the threshold value for the time may be a duration of an (incident) force (or force component) and/or of its temporal change, in which the threshold value (the threshold values) of the force (or force component) and/or or their temporal change is (are) exceeded (or fallen below).

A temporal change may generally be understood to mean the temporal derivation of the force (or force component) (in the mathematical sense). However, a temporal change may also be understood to be $\Delta F/\Delta t$ (with terminal non-infinitesimal $\Delta t$ instances in the range from 100 milliseconds to 1 second for example).

The at least one control device is preferably a closed-loop control device, particularly a closed-loop control device for continuous (optionally linear) regulation of the output of the at least one motor, preferably a PID closed-loop control device (wherein PID stands for proportional integral derivative).

Preferably, at least one brake device, particularly a retarding brake device and/or parking brake device is provided. The retarding brake device is preferably designed to use kinetic energy of the stroller frame or stroller (with child) for braking (and particularly convert it into electrical energy). Alternatively or additionally, a/the control device may be provided and designed in such manner that the parking brake device is activated automatically after a predetermined time, preferably between 3 seconds and 5 minutes (preferably between 10 seconds and 30 seconds) after a (complete) standstill of the stroller frame (following previous movement). Alternatively or additionally a/the control device may be provided and designed in such manner that the parking brake device is activated automatically after a standstill or a relatively low speed is reached following previous travel.

The brake device may particularly be constructed in two stages, preferably in such manner that both a retarding brake (service brake) and a parking brake for maintaining a parked position (when the stroller is at a complete standstill) is present. The retarding brake may be constructed in such manner that the stroller is braked by friction (on one or more wheels) (wherein kinetic energy is converted into heat). Preferably however, at least one motor may be used as a generator to decelerate the stroller (wherein kinetic energy is converted into electrical energy, which in turn can be used to charge one or more batteries). For the retarding brake, any actuating device may be provided, for example a hand- or finger-operated lever (on the pusher bar or handle) or another apparatus (for example a rotatable handle or a foot pedal or the like). As an option, it is also possible that a graphical user interface (e.g., display, particularly touchscreen) is connected to the stroller and/or includes a receiver to enable connection to an external device (e.g., a smartphone with a corresponding app). The actuating device (or the receiver) may be connected to the retarding brake (by suitable means) in order to actuate the retarding brake, i.e., to apply the braking force desired by the user (which may be zero or greater than zero, in particular may assume more than 2 or more than 5 values greater than zero). The retarding brake may continue to act for as long as the actuating device is operated, or until the stroller is brought to a complete standstill and then optionally the parking brake is effective.

The parking brake may be designed as a detent mechanism which prevents one or more wheels from turning. For example, the parking brake may comprise a pin that cooperates with storage devices or locking devices (grooves, for example), which are provided in a lateral surface of the wheel.

The parking brake may optionally be activated (automatically) immediately after or a predetermined time after the stroller frame and the stroller has been stopped, particularly by the retarding brake.

The at least one parking brake device is preferably (only) activatable electrically or electronically and (only) releasable manually.

The parking brake device may be preloaded in a released state and not or (only) preloaded to a lesser degree in an activated state. By these measures, safety during operation is improved.

The actuation of the parking brake may be effected in various ways, for example via a switch, e.g., a sliding switch or pressure switch, or a foot pedal or the like.

Particularly when the parking brake is preloaded in the activated state, release of the parking brake is (only) possible manually, whereas optionally an activation of the brake is optionally enabled (only) electronically or electrically.

A/the sensor device, particularly the force sensor device may be provided and the/a control device may be designed in such manner that at least one brake device, particularly the retarding brake device and/or the parking brake device is activated when a person operating the stroller releases a contact, e.g., by hand and via the handle. The retarding brake is preferably activated with increased (maximum) force and/or the parking brake is activated (emergency braking) when it is determined that the person operating the stroller has no contact (an longer) with the stroller but the stroller is still moving.

In one variant, the control device is designed in such manner that the brake device is activated when the force sensor device detects a force which is directed (at least partially) against the current direction of movement of the stroller frame. Alternatively, in such a case a motor support as described above may be effected. Preferably, the motor is used as a power generator in the event of a braking action.

In some variants, the brake device may be activated for converting kinetic energy of the stroller frame into electrical energy when a predetermined minimum speed is reached. In this context, the stroller frame is preferably kept constantly at the predetermined speed (by this). Particularly if the motor has no idling function due to the design of the variant, high voltages can then occur at high speeds and damage the electronics. Moreover, such a mechanism may prevent an unintended acceleration above a certain speed and thus improve safety.

At least one display and/or signalling device may be provided which alerts the user of the stroller frame to the fact that motor support is in effect or may be in effect. Optionally, a first display and/or signalling device may indicate that motor support is currently in effect, and a second display and/or signalling device may indicate that motor support may be in effect in the sense that, depending on further parameters (a maximum speed or the like, for example), motor support is either in effect (if the parameters meet the requirements) or not.

A/the control device of the stroller or stroller frame is preferably configured in such manner that the motor may be controlled, optionally regulated depending on a rotation of at least one wheel, preferably a rear wheel. In particular, a control, particularly regulation of a/the motor (supporting drive) of the stroller or stroller frame (in addition to the force acting on the pusher bar) may depend on whether the (rear) wheels (or at least one (rear) wheel) is (are) rotating. Also, preferably no support should be effective when force is incident (or a force threshold is exceeded) if the (rear) wheels are not rotating.

An A/D converter is preferably provided which is configured to digitise an analogue signal detected by the sensor device and which is preferably connected upstream of the sensor device. In the present case, the sensor device (arranged in the pusher bar) can detect an analogue signal. This may be digitised (optionally directly and without intermediate further processing) after the detection (A/D converter) and preferably only then be forwarded to the motor or to a control device for controlling/regulating the motor. In this context, account may advantageously be taken of the fact that possibly only comparatively small voltage differences are generated by the sensor device and the digital signal is less susceptible to interference from ambient influences (e.g., undefined contact resistances between sensor device and motor). In the present case, a microcontroller may be placed with (particularly on or in spatial proximity to) the sensors in the pusher bar and carry out an A/D conversion, and by which preferably the digital signal, is sent to the one or more actual controller(s) (control device(s) of the motor (optionally several motors) (e.g., on the axle), optionally together with a control information, particularly a check digit (or a check digit block). There, a check may be carried out, particularly a checksum created, and the signal may be processed further and evaluated for actuation of the motors. In this way, any incorrect data packets may be filtered out and not used for controlling (e.g., if a transmission error occurred).

In some variants, a/the control device of the stroller or stroller frame may be configured in such manner that a rocking function is switched on when no pushing force is present or the force falls below a corresponding force threshold and/or when the stroller and the stroller frame is at a (complete) standstill or falls below a certain speed.

If no (drive) support is supplied, it may be provided depending on the variant that the motor or motors is/are in idling mode.

Overall, the stroller and/or stroller frame of the present invention may enable convenient support when pushing (or pulling) the stroller. In particular, it is possible to set values $F_{f1}$ and/or $F_{r1}$ which (substantially) define those forces which must be applied (as a maximum) by the user (irrespective of the situation). If one starts with a stroller which is stationary, the user will begin to push (or pull). Immediately, the horizontal component of the pushing force or pulling force will become greater than zero. At the point in time when $F_{f1}$ is reached, the motor can begin to support the user (with minimum power). For example, if the horizontal component of the pushing or pulling force increases further (i.e. $\Delta F_{inh}/\Delta t > 0$), the supporting force will also increase (i.e. $\Delta F_s/\Delta t > 0$). In this way, the horizontal component of the force may be kept (substantially) constant for $F_{f1}$ (at least if overshooting is ignored). Of course, if a condition for stopping the motor support is present, a greater force may be necessary.

$F_u$ may lie between 0 and 25 N, preferably between 5 N and 15 N. $F_d$ may lie between 10 N and 50 N, preferably between 20 N and 40 N. $F_{f1}$ may lie between 0 and 25 N, preferably between 5 N and 15 N. $F_{r1}$ may lie between 0 and 25 N, preferably between 5 N and 15 N. $F_{f2}$ and/or $F_{r2}$ may lie between 25 N and 500 N, preferably between 50 N and 200 N.

$F_{f1}$, $F_{r1}$, $F_{f2}$ and/or $F_{r2}$ may be specified by the user, for example via an interface, such as a graphical user interface for example, and/or a smartphone (and a smartphone app). Minimum and maximum values may possibly be specified (depending on manufacturer) to avoid safety issues and/or in order to prolong the service life of a battery.

Further variants are described in the subordinate claims.

Figure 2:
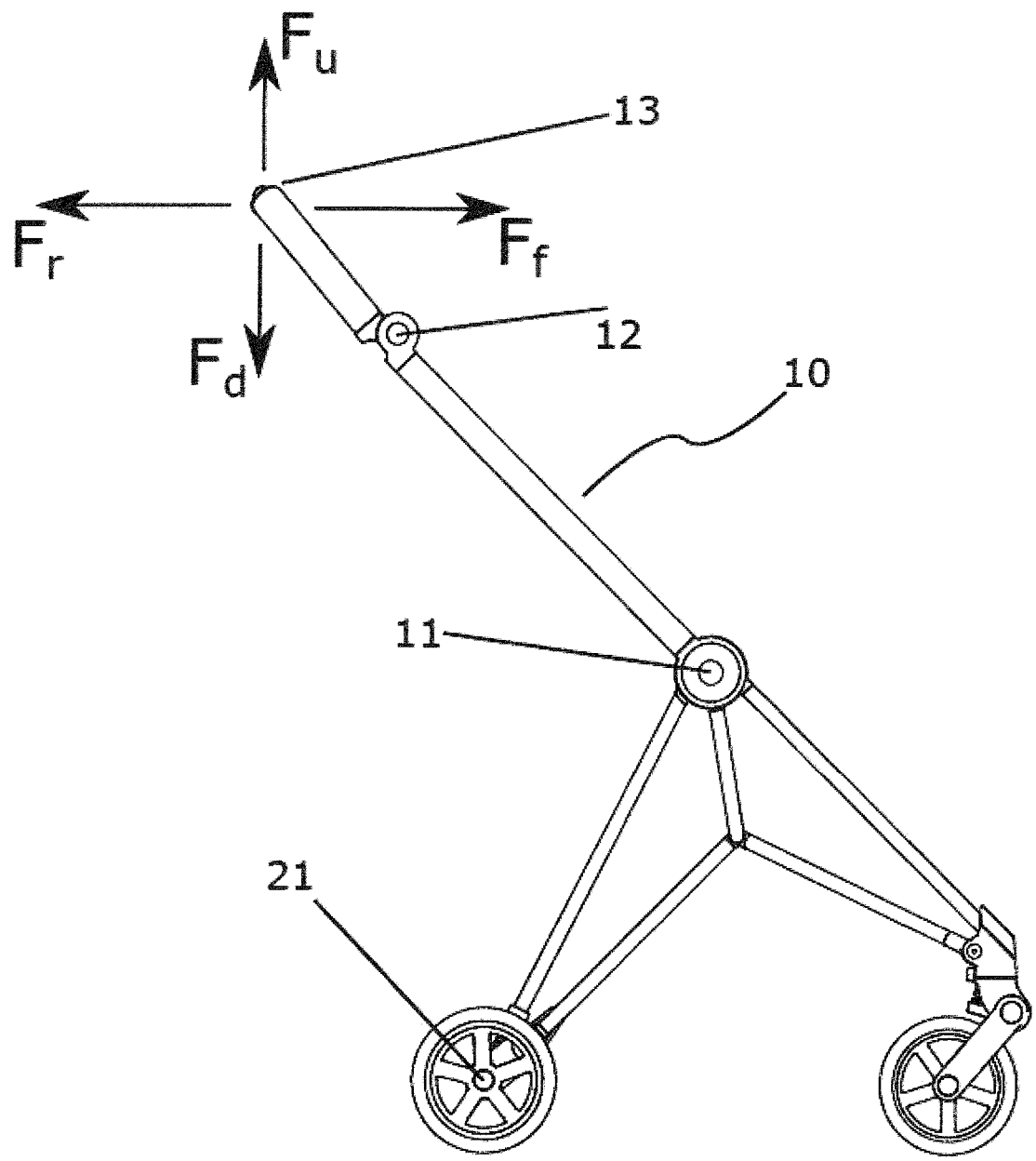

In the following text, the invention will be described using an exemplary embodiment, which will be explained in greater detail with reference to the figures. In the drawing FIG. 1 shows a schematic oblique view of a stroller frame according to the invention;

FIG. 2 shows a side view of the stroller frame of FIG. 1.

In the following description, the same reference numbers are used for identical parts and parts with equivalent effect.

FIG. 1 shows a stroller frame according to the invention in a schematic oblique view. The arrow $F_d$ illustrates a downwardly directed force acting on a handle 13 (horizontal section of a pusher bar 10). The arrow $F_u$ illustrates an upwardly directed force acting on the handle 13. The arrows $F_{lat}$ illustrate laterally directed forces. The handle 13 is supported so as to be swivellable relative to a lower section of the pusher bar 10.

In the present case, the handle 13 may be swivelled into various positions (and locked), to carry out a height adjustment of the handle 13.

A swivelling bearing 12 (with corresponding articulations) is provided between the swivellable handle 13 and the lower section of the pusher bar 10.

The (entire) pusher bar 10 is in turn preferably supported in swivelling manner on a swivelling bearing 11 on a main body of the stroller frame (particularly to enable the stroller frame to be folded down).

Preferably one or more sensor device(s) is/are provided in the swivelling bearing 11 and/or in the swivelling bearing 12 to detect a force from a user (particularly $F_u$ and $F_d$) acting on the handle 13. In addition, (see FIG. 2) a forwards directed force $F_f$ and a backwards directed force $F_r$ may be detected preferably with a sensor device of such kind or sensor devices of such kind. Motors (not shown in detail) may preferably be placed in wheel hubs 21. Alternatively, motors may be placed on an axle 22 (particularly on sections of the axle that are adjacent to the wheel hub 21).

At this point, it should be noted that all of the parts described above are claimed as essential to the invention both on their own merits and in any combination, particularly the details represented in the drawings. Modifications thereto are commonly known to the person skilled in the art.

REFERENCE SIGNS

10 Pusher bar
11 Swivelling bearing
12 Swivelling bearing
13 Handle (horizontal section of the pusher bar)
21 Wheel hub
22 Axle

The invention claimed is:

1. A stroller frame, comprising:
   at least one motor, particularly an electric motor, for assisted driving of the stroller frame;
   a pusher bar for pushing the stroller frame;
   at least one force sensor device for detecting a direction or an amount of a force or a force component which acts on the pusher bar, or to detect a value derived from this force or force component, particularly a temporal change of the force or force component; and
   at least one control device which is in operative connection with the at least one force sensor device, particularly in such manner that an output from the at least one force sensor device can be used for controlling the at least one motor,
   wherein one or both of
     the at least one control device is configured such that at least one motor is started when a first threshold of the force or force component or the value derived therefrom is exceeded, or is configured such that at least one motor is stopped or kept at constant power when a second threshold of the force or force component or the value derived therefrom is exceeded, and
     the at least one control device is configured such that when a threshold $F_d$ of a downward acting force is exceeded or when a threshold $F_u$ of an upward acting force is exceeded, or when a threshold $F_{r2}$ of a forward acting force is exceeded or when a threshold $F_{r2}$ of a backwards acting force is exceeded, at least one motor is stopped or maintained at a constant power, wherein $F_{f2}$ or $F_{r2}$ is preferably greater, particularly at least 2 times or 5 times or 20 times as great as/greater than $F_u$ or $F_d$ or wherein upon falling below, after previously exceeding $F_{f2}$, $F_{r2}$, $F_u$ and/or $F_d$ the motor is started again, or wherein the at least one control device is configured such that upon exceeding a threshold $F_{f1}$ of a forward acting force or upon exceeding a threshold $F_{r1}$ of a backward acting force, at least one motor is started, wherein $F_{f1}$ is preferably smaller than $F_{f2}$ or $F_{r1}$ is preferably smaller than $F_{r2}$.

2. The stroller frame according to claim 1, wherein the at least one force sensor device is arranged on or in the pusher bar, particularly a handle of the pusher bar, or in or close to a pusher bar fastening area.

3. The stroller frame according to claim 1, further including at least one control device which is in operative connection with the at least one force sensor device, particularly in such manner that an output from the at least one force sensor device can be used for controlling the at least one motor.

4. The stroller frame according to claim 3, further including at least one speed sensor or at least one cornering sensor.

5. The stroller frame according to claim 3, wherein the at least one control device is configured such that a quotient derived from a pushing force or a pulling force or a particularly horizontal pushing force component or a pulling force component and a supporting force of the at least one motor is constant or is variable, in such manner that the supporting force increases linearly with the pushing force or pulling force or with the pushing force component, or wherein the at least one control device is configured such that a quotient derived from a temporal change of the pushing force or pulling force from a temporal change of a particularly, horizontal pushing force component or pulling force component and a temporal change of the supporting force of the at least one motor is constant or is variable, in such manner that the temporal change of the supporting force increases linearly with the temporal change of the pushing force or pulling force of the pushing force component or pulling force component.

6. The stroller frame according to claim 3, wherein the at least one control device is configured such that the driving power of the at least one motor is throttled or stopped when a brake is operated.

7. The stroller frame according to claim 3, wherein the at least one control device is a closed-loop control device, particularly a closed-loop control device for continuous regulation of the power of the at least one motor, preferably a PID closed-loop control device.

8. The stroller frame according to claim 3, wherein the at least one control device is configured such that the motor can be controlled as a function of a rotation of at least one wheel.

9. The stroller frame according to claim 3, further including an A/D converter device configured to digitize an analog signal detected by the at least one force sensor device.

10. The stroller frame according to claim 1, wherein the at least one force sensor device is configured to detect forces or force components acting on the pusher bar or values derived therefrom in at least two different locations, particularly on a first and on a second side of the pusher bar, particularly on a first and a second side of a handle or on two different handles, particularly arranged on either side.

11. The stroller frame according to claim 10, wherein the at least one force sensor device comprises at least one torque sensor or at least two sensors.

12. The stroller frame according to claim 1, wherein the pusher bar or a section of the pusher bar, particularly a section of the pusher bar which at least partially includes the sensor device, is movable, particularly against a restoring force, preferably over a path of at least 2 mm, more preferably at least 10 mm.

13. The stroller frame according to claim 1, wherein the at least one force sensor device is configured to detect a progression of the force or force component or of the derived value.

14. The stroller frame according to claim 1, wherein multiple motors, particularly electric motors, are provided for driving the stroller frame, wherein one motor each is attached to at least two or exactly two wheels, wherein a control device for individual actuation of the motors or a sensor device is provided for detecting a pushing force or pulling force or movement of the stroller frame.

15. A stroller, such as a pushchair, buggy or similar vehicle for children, having a stroller frame according to claim 1.

16. A method for controlling a stroller according to claim 15, wherein a direction or an amount of a force or of a force component acting on a pusher bar or a value derived from this force or force component, particularly a temporal change of the force or force component is detected.

17. A stroller frame comprising:
at least one motor, particularly an electric motor, for assisted driving of the stroller frame;
a pusher bar for pushing the stroller frame;
at least one force sensor device for detecting a direction or an amount of a force or a force component which acts on the pusher bar, or to detect a value derived from this force or force component, particularly a temporal change of the force or force component; and
at least one control device which is in operative connection with the at least one force sensor device, particularly in such manner that an output from the at least one force sensor device can be used for controlling the at least one motor,
wherein at least one parking brake device is provided,
wherein the at least one control device is configured such that the parking brake device is activated automatically after a predetermined time, preferably between 3 seconds and 5 minutes after a standstill of the stroller frame,
or wherein the at least one control device is configured such that the parking brake device is activated automatically after a standstill or a relatively low speed is reached following previous travel.

18. The stroller frame according to claim 17, wherein the at least one parking brake device can be activated electrically and can be released manually or is preloaded in a released state and in an activated state is not preloaded or preloaded to a lesser degree.

19. The stroller frame according to claim 17, further including a sensor device, particularly the force sensor device and wherein the control device is configured such that at least one brake device, particularly the retarding brake device or the parking brake device is activated by a contact on a handle of the pusher bar.

20. The stroller frame according to claim 17, wherein the at least one control device is configured such that the brake device is activated when the at least one force sensor device detects a force that is at least partially directed against the current direction of movement of the stroller frame.

21. A stroller frame comprising:
at least one motor, particularly an electric motor, for assisted driving of the stroller frame;
a pusher bar for pushing the stroller frame; and
at least one force sensor device for detecting a direction or an amount of a force or a force component which acts on the pusher bar, or to detect a value derived from this force or force component, particularly a temporal change of the force or force component,
wherein at least one display or signalling device is provided, wherein the at least one display or the signalling device alerts the user of the stroller frame when a motor support is present or may be present.

* * * * *